Patented June 27, 1933

1,916,106

UNITED STATES PATENT OFFICE

ADOLF GORHAN, OF LIESING NEAR VIENNA, AUSTRIA, ASSIGNOR, BY MESNE ASSIGNMENTS, TO FIRM OF DEUTSCHE GOLD- UND SILBER-SCHEIDEANSTALT VORMALS ROESSLER, OF FRANKFORT-ON-THE-MAIN, GERMANY, A CORPORATION OF GERMANY

PROCESS FOR EXTRACTING CONCENTRATED VOLATILE ALIPHATIC ACIDS

No Drawing. Application filed May 24, 1928, Serial No. 280,395, and in Germany February 16, 1927.

The invention relates to the extraction of volatile aliphatic acids in concentrated form from their dilute solutions, for example to the extraction of high percentage acetic acid from raw pyroligneous acid.

It is well known that acetic acid may be concentrated by introducing neutral alkali acetates into the dilute acetic acid and obtaining the acetic acid in concentrated form by decomposing the acid salts thus formed, which for example may be effected by allowing the acid acetate to crystallize out and driving off the acetic acid by heating, or by distilling off firstly the water with a small portion of acetic acid, if desired in vacuo by heating the dilute solution, and then obtaining the acetic acid in concentrated form from the residue by further heating.

These processes have not been used commercially hitherto as the extraction of fatty acids from their acid salts causes considerable difficulties. If the acid is driven off at too high a temperature losses occur by reason of the formation of ketones, whilst when using low temperatures the decomposition of the salts is only effected incompletely, or an extremely long time and consequently large apparatus and power consumption are necessary. For the decomposition of the salts there are required apparatus in which the solid salts must be thoroughly mixed together and comminuted, as by reason of the bad heat conductivity of the salts, even in the case of careful heating, local over-heatings may easily occur which again lead to losses.

According to the present invention all these difficulties are eliminated by the use of salts or salt mixtures which have such a low melting point that they are in the liquid condition during the decomposition process. When using salt mixtures at least one of the constitutents, such as for example alkali acetate, must have the property of combining the acid to be obtained, whilst other constituents should have the property of reducing the melting point of the mixture. Preferably however mixtures of such salts are selected each of which is capable of combining the acid in question. As suitable salt mixtures may for example be mentioned those of various alkali acetates or alkaline earth acetates or alkali and alkaline earth acetates, including magnesium acetates or salts of other acids, for example other fatty acids. The salts or salt mixtures are preferably selected from the point of view that the whole of the material will be in the molten liquid condition during the decomposition process. The advantages of the process are also exhibited when a sufficiently large portions of the salts or salt mixtures are in the liquid condition when carrying out the decomposition process.

The process has the advantage that the molten liquid mass by reason of its high heat conduction and ready capability of mixing can be easily decomposed completely in a very short period of time without the occurrence of disturbing auxiliary actions, such as losses, due to overheating and the like.

The driving off process can be carried out in comparatively simple apparatus, as for example ordinary distillation retorts, pans, columns, towers and so forth, as the heating of a liquid to the desired temperature does not cause any difficulty. In comparison with the known processes hereinbefore referred to the heat consumption is much less. The power consumption is extremely small.

According to one method of carrying the invention into effect the operation is such that the dilute acid for example dilute acetic acid, is treated in the form of vapour with the salts capable of combining the acid, for example a mixture of sodium and potassium acetate, for example in such a manner that the acid-vapour mixture and the concentrated salt solution are brought into contact with one another by the use of the counter-current principle. Further the operation may also be carried out with advantage, for example in such a manner that the acid is extracted from dilute solutions thereof by means of organic solvents, particularly such which, on the one hand, are capable of absorbing large quantities of the acid and which, on the other hand, are readily separated from water, as for example acetone oils, wood spirit oils, ether, butyl alcohol, mixtures of acetone oils with benzol or the like, and then treating the acid solutions thus obtained with salts which are capable of forming acid salts which on decomposition produce the combined acid in concentrated form.

The treatment of the acid vapours or the solutions of the acid in organic solvents is effected, in accordance with the present invention, by the use of such salts or salt mixtures which remain in the form of a molten liquid either wholly or partly when carrying out the subsequent decomposition process.

*Examples*

1. To 2500 kg. 50% acetic acid are added 1100 kg. sodium acetate free from water and 1300 kg. potassium acetate free from water. The mixture is heated in a distillation retort, the temperature being constantly increased. At 170° C. almost all the water with a small portion of the acetic acid has been distilled off as 10 to 12% acid. Then an additional plant is brought into use and further distillation takes place, if desired with the use of a reduced pressure, until a temperature of 300° C. is reached. The remainder of the acetic acid then distils off as 95% acid. The neutral acetates remain as residue in the retort and these may be reused. The contents of the retort do not form a solid mass at any stage of the process.

2. From a solution of 250 kg. butyric acid in 350 kg. acetone oil the butyric acid is extracted on the counter-current principle with a concentrated solution of 160 kg. potassium butyrate and 100 kg. zinc butyrate in water and the salt solution is heated in a distillation retort. Up to 200° C. about 15% of the butyric acid distils off as a dilute first running, the remainder being obtained as a 70% butyric acid. The process is suitable in an excellent manner for obtaining concentrated acid, such as formic acid, acetic acid, propionic acid, butyric acid and the like.

I claim:—

1. A process for extracting concentrated volatile aliphatic acids from solutions of the acid consisting in treating the dilute solution with mixtures of salts of which at least one salt forms with the corresponding aliphatic acid a double salt, having a low melting point so that they remain substantially in the molten liquid condition during the subsequent decomposition process, and decomposing the compounds thus obtained by heating.

2. A process for extracting concentrated volatile aliphatic acids from solutions of the acid consisting in treating the dilute solution with mixtures of normal alkali metal salts of fatty acids of which at least one of the salts is capable of combining with the acid to form a double salt, and having a low melting point so that they remain substantially in the molten liquid condition during the subsequent decomposition process, and decomposing the compounds thus obtained by heating.

3. A process for extracting concentrated acetic acid from solutions of the acid consisting in combining acetic acid with mixtures of alkali metal acetates, said alkali metal acetates being of such a composition that the acid salts which are formed remain in a molten liquid condition during the subsequent decomposition process, and decomposing the acid salts thus obtained by heating.

4. A process for extracting concentrated volatile aliphatic acids from solutions thereof consisting in bringing dilute solutions of fatty acids in the form of vapour in contact with mixtures of salts at least one of which is capable of combining with the acid to form a double salt, and having a low melting point so that they remain in the molten condition during the subsequent decomposition process, and decomposing the acid acetates thus obtained by heating.

5. A process for extracting concentrated acetic acid from solutions thereof consisting in bringing raw pyroligneous acid in the form of vapour in contact with mixtures of salts at least one of which is capable of combining with the acid to form a double salt, and having a low melting temperature so that they remain in the molten condition during the subsequent decomposition process and decomposing the acid acetates thus obtained by heating.

6. A process for extracting volatile aliphatic acids from solutions of the acid, consisting in treating the dilute solutions with salt mixtures of which at least one of the salts is capable of combining with the acid, to form a double salt which is readily separable from water, and decomposing the resulting double salts in molten liquid condition in order to obtain the concentrated acid.

In testimony whereof I affix my signature.

ADOLF GORHAN.